June 2, 1970

O. W. LIVINGSTON 3,515,534

RECYCLING AMMONIUM SULFATE IN NITRIC PHOSPHATE PROCESSING

Filed Sept. 30, 1969

FLOW DIAGRAM OF THE BASIC AMMONIUM SULFATE RECYCLE PROCESS

Owen W. Livingston, INVENTOR

BY Robert A. Petruck, agent

FLOW DIAGRAM OF IMPROVED AMMONIUM SULFATE RECYCLE PROCESS

IMPROVED CALCIUM SULFATE CONVERSION VESSEL

FLOW DIAGRAM OF IMPROVED AMMONIUM SULFATE RECYCLE PROCESS 3,515,534
RECYCLING AMMONIUM SULFATE IN NITRIC PHOSPHATE PROCESSING
Owen W. Livingston, Killen, Ala., assignor to Tennessee Valley Authority, a corporation
Continuation-in-part of application Ser. No. 706,367, Feb. 19, 1968. This application Sept. 30, 1969, Ser. No. 864,276
Int. Cl. C05b 7/00; C01b 25/28
U.S. Cl. 71—34                                    12 Claims

ABSTRACT OF THE DISCLOSURE

Methods for (1) obtaining N:$P_2O_5$ ratios in subject products other than the normal 2:1 which involve ammoniation of the usual product acid filtrate to form an insoluble phosphate which is separated from a soluble nitrate; (2) agglomerating the normal precipitated impurities encountered in such a separation to facilitate rapid removal of all solids formed in the separation step; (3) obtaining an unusually high conversion anl a fast-filtering slurry of calcium carbonate resulting from the reaction of gypsum cake with ammonium carbonate solution by conditions of mild but adequate agitation; (4) forming gypsum slurry in which a resulting higher filtering rate is obtained.

---

The invention herein described may be manufactured and used by or for the Government for governmental purposes without the payment to us of any royalty therefor.

This application is a continuation-in-part of my copending application Ser. No. 706,367, filed Feb. 19, 1968, and now abandonel for Recycling Ammonium Sulfate in Nitric Phosphate Processing.

My invention relates to certain improvements principally on three phases of the basic ammonium sulfate recycle process (including the Merseberg conversion of gypsum) for removal of calcium from nitric phosphate fertilizer; more particularly to certain improvements in the ammonium sulfate recycle process, which is also known as the Liljenroth process, wherein the heretofore minimum normal (i.e., without adjustment with additional phosphate over stoichiometric requirements) obtainable N:$P_2O_5$ ratio in the product is about 2:1 and results in a maximum total grade of approximately 28–14–0, is made flexible such that the grade of the product from my improved process can be varied so as to produce a minimum N:$P_2O_5$ ratio of about 1:1.5 (21–32–0 grade); and more particularly to the treatment of normal precipitated impurities (phosphates of calcium, iron, aluminum, and fluorine) encountered in varying the grades of products by my process which results in the growth of large agglomerates which filter and wash at much higher rates than are normally feasible; and still more particularly to certain improvements in the ammonium sulfate recycle process which, in addition to allowing for greater flexibility in the grade of product produced, results in the growth of large spherical agglomerates or aggregates of calcium carbonate which filter and wash at much higher rates than those normally encountered in existing commercial operations employing the Merseberg ammonium sulfate fertilizer process involving conversion of gypsum from the crystallization step to calcium carbonate plus ammonium sulfate.

Heretofore the chemical fertilizer industry, at least in this country, in practicing phosphate rock extraction processes have concentrated substantially all of their efforts on the use of sulfuric acid as the leaching agent for winning the $P_2O_5$ values from particulate phosphate rock.

Recently the shortage of sulfur and the resulting increase in prices thereof has tended to focus a good deal of attention on trying to adapt to the use of nitric acid rather than sulfuric acid as the leaching agent for extracting these $P_2O_5$ values from the rock. It is believed that presently there are very few, if any, commercial installations practicing the basic ammonium sulfate recycle process which is carried out by recycling ammonium sulfate solution and reacting it with nitric acid-phosphate rock extraction acidulate and removing approximately 95 percent of the calcium from said acidulate prior to ammoniation and granulation whereby is recovered a product, which is usually up to about 90 percent water soluble, having a fixed grade of about 28–14–0. Such prior-art reaction of the acidulate with strong sulfate solution precipitates the calcium as gypsum, which is in turn removed by filtration and reacted with ammonia and carbon dioxide to regenerate ammonium sulfate solution. The calcium formed in the reaction is separated by filtration and becomes a byproduct or is discarded. My tests using the basic ammonium sulfate recycle process resulted in an average $P_2O_5$ recovery of about 95 percent and a sulfate loss which was equivalent to about 30 pounds of sulfur per ton of product [made up as $H_2SO_4$, $CaSO_4$, or $(NH_4)_2SO_4$]. Thus, it may be seen that this basic process is much less flexible than sulfuric acid based processes and that obtaining a N:$P_2O_5$ ratio in a single product therefrom of less than about 2:1 is not feasible.

The chemical fertilizer industry has recognized these limitations in the basic ammonium sulfate recycle process and has evolved certain alternate improved methods of the basic process in an effort to alleviate the inherent disadvantages of the Liljenroth process. These improvements and variations from the basic process evolved to date are generally concerned with (1) a separation of products in the product acidulate step as found in the following U.S. Pat. Nos.: 1,788,828, Goldberg; 1,806,029, Thorssell; 1,849,704, Boller; and 2,689,175, Strelzoff et al. The other general approach has been (2) modifications in the gypsum conversion step, as is found in the following patents: French 972,445, U.S. 2,640,757, and 2,656,247, Robinson, and Indian Pat. 73,275. Although the teachings and disclosures in the patent literature just cited do tend to lend some degree of improvement to the basic process, they still leave much to be desired for allowing a greater flexibility in the N:$P_2O_5$ ratio in the products therefrom and in substantially increasing the filtering rates in the gypsum conversion stages to thereby substantially increase the throughput of the equipment required in order to provide an improved ammonium sulfate recycle process which can compete with the more flexible sulfuric acid based processes for the acidulation of phosphate rock and the extraction therefrom of the $P_2O_5$ values. Further, these modifications are limited in the percent of recovery of the total $P_2O_5$ values originally present in the phosphate rock thereby further minimizing the competitive position with the sulfuric acid based processes.

The following U.S. Pats. 2,819,856 (Getsinger et al.) and 3,420,623 (Barker) are also concerned with group (1) above, to wit, separation of products in the product acidulate step, and are different from my teachings for numerous reasons, some of which are enumerated below:

(a) Both Getsinger and Barker restrict their disclosures to a single component aqueous system, i.e., wet-process phosphoric acid, whereas I claim application to a different system, a two-component aqueous system, i.e., phosphoric acid plus ammonium nitrate.

(b) The purpose of both Getsinger and Barker is to separate one phosphatic material from another (impure phosphate byproducts from the product phosphate) whereas I claim the purpose of separating a phosphatic product from a nitrogenous product.

(c) In both Barker and Getsinger, it is necessary to remove the unwanted impure phosphate byproducts from the product system and handle them separately in order to achieve the objective of the patents; in my process, these impurities are handled incidentally and concurrently with the principal phosphate product.

(d) Barker does not allude to a readily filterable phosphatic byproduct; in fact, he requires a complicated system of a settler, three ammoniators, two reactors, a classifier, three filters, and three dryers, to achieve his objective. I can produce two products in two ammoniator stages, one filter, an evaporator, a granulator, and two driers.

(e) Getsinger et al. teaches a process that requires preconcentration of the feed material, and ammoniation at a critical low rate to successfully achieve the desired results. In my process, no preconcentration is necessary, and the ammoniation rate is not important except at impractically high rates where bubbling losses might occur.

My invention is directed to improvements over both (1) the basic ammonium sulfate recycle process which results in obtaining a greater flexibility in the $N:P_2O_5$ ratio of the product therefrom to the extent that I am able to obtain a minimum $N:P_2O_5$ ratio as little as 1:1.5, such as, for example, in producing a product of grade 21–32–0, and at the same time in improving upon the product separation (filtration or centrifugation) step by forming unusually large agglomerates of the impurities which filter rapidly, and (2) the Merseberg conversion of gypsum from the crystallization step which permits the growth of unusually large spherical agglomerates of calcium carbonate which filter and wish at much higher rates than normally encountered in existing commercial operations or in processes of the prior art, thereby greatly enhancing throughput capacity of readily available equipment which would be used in the basic Liljenroth or ammonium sulfate recycle processes.

I have overcome the difficulties inherent in the processes of the type of the prior art to a substantial extent in the present invention by improvements over the basic ammonium sulfate recycle process which comprises basically two improvements, A and B, which may be combined with a third improvement C. These improvements comprise the following:

Improvement A comprises a method for dividing the normally fixed grade (approximately 28–14–0) of products into two fractions, (1) reasonably pure ammonium nitrate (33.5–0–0) and (2) N—$P_2O_5$ product having a minimum $N:P_2O_5$ ratio of about 1:1.5 (21–32–0 grade). This is accomplished by ammoniating the product filtrate to a pH in the range of about 9.1 to about 9.3 and filtering off the precipitated N–P product; the filtrate from this step being a fairly pure ammonium nitrate in aqueous solution.

Alternatively, and in still another embodiment of my invention and modification of improvement A, I have found that by adjusting the pH to a somewhat lower value (6.5–8) the phosphate can be distributed between two products giving, for example, one high $N:P_2O_5$ ratio product and one lower $N:P_2O_5$ ratio product. If this version or embodiment of my improvement A is practiced, the ammonium phosphate-ammonium nitrate solution filtrate (high $N:P_2O_5$ ratio) would be concentrated by evaporation and then prilled or granulated in a separate stream; with water solubility of the $P_2O_5$ in the evaporated product of 100 percent and water solubility of the $P_2O_5$ in the precipitated product of about 90 percent.

In still another embodiment of my invention and another modification of improvement A, I have found that adding another ammoniation stage prior to that stage described in improvement A and ammoniating to a pH of 5.0–5.8 at an elevated temperature (220–235° F. boiling) the iron, aluminum residues, calcium, and fluorine phosphate compounds (impurities), which normally precipitate in the separation step (improvement A) and result very low filtration rates because of their extremely fine particle sizes, can be formed into large agglomerates which filter rapidly, thus increasing the throughput of normally available equipment.

Improvement B involves the Merseberg conversion of gypsum from the crystallization step to calcium carbonate plus ammonium sulfate solution. The ammonium sulfate is recycled to the gypsum crystallization step. This improvement is equally applicable to the commercial Merseberg ammonium sulfate fertilizer production process, which can be and is now operated as a separate process. The improvement consists of changing from the usual multistage well-agitated conversion vessels arranged in series to a large single-stage converter equipped with a very low-supeed agitator and a supernatant liquor recycle pumping system. As a matter of fact, as will be seen infra, I have found that it sometimes is best to do away with the low-speed mechanical agitator in the large single-stage converter and utilize the fluidized bed action resulting from the supernatant liquor recycle pumping system to accomplish what I found to be critical, to wit, very gentle agitation in a single converter. This very gently but adequate agitation has been found to permit the growth of large spherical agglomerates of calcium carbonate which filter and wash at much higher rates than those normally encountered in existing commercial operations using this process or in other processes of the prior art. Further, the conversion of the calcium sulfate to the calcium carbonate in this improved embodiment of my invention is relatively high, i.e., up to 97 percent.

Improvement C, which, as I have stated above, may or may not be utilized together with improvements A and B supra, involves the use of two extractors rather than the usual single extractor upstream of the calcium sulfate precipitator or gypsum crystallizer. More specific details of the condition necessary to practice this improvement C, together with my theory as to the effect it produces on the overall improved process, will be given infra. Furthermore, several new and advantageous features over the conventionl processes of the prior art for the practice of ammonium sulfate recycle process are realized by the present invention.

Among these advantageous features are: an improved process utilizing the ammonium sulfate recycle method wherein the product therefrom has a great flexibility in the $N:P_2O_5$ ratio; a process which has a minimum $N:P_2O_5$ ratio of about 1:1.5, whereas prior-art processes yielded only a minimum $N:P_2O_5$ ratio of about 2:1 a greatly improved gypsum converter method which makes it possible to achieve high conversion with a reasonable retention time and with high filtration rates without additional gypsum pretreatment steps; a process which circumvents the problems presented by the tight supply and increasing price of sulfur, the pressing need for increased amounts of available phosphate throughout the world; and a process which, in view of the dire foreign exchange situation in most developing countries, makes it highly desirable that any additional phosphate production capitalization may now be based on processes requiring little or no sulfur.

It is therefore an object of the present invention to provide a process for the economical and direct use of nitric phosphate processes employing the ammonium sulfate recycle method for phosphate fertilizer production which requires little or no sulfur.

Another object of the present invention is to provide a process for the economical and direct use of nitric phosphate processes employing the ammonium sulfate recycle method for phosphate fertilizer production which requires little or no sulfur, and which process has greater flexibility than those heretofore evolved in the $N \cdot P_4O_5$ ratios obtainable in the products therefrom.

Still another object of the present invention is to provide a process for the economical and direct use of nitric phosphate processes employing the ammonium sulfate recycle method for phosphate fertilizer production which requires little or no sulfur, which process has greater flexibility than those heretofore evolved in the N:P$_2$O$_5$ ratios obtainable in the products therefrom, and which process provides for the growth of large spherical agglomerates of calcium carbonate in the gypsum conversion step, which agglomerates filter and wash at much higher rates than heretofore obtainable, thereby greatly enhancing the throughput capacity of equipment employing said process.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the true spirit and scope of the present invention.

My invention, together with such further objects and advantages thereof, will be better understood from a consideration of the following description taken in connection with the accompanying drawing in which.

Figure 3:
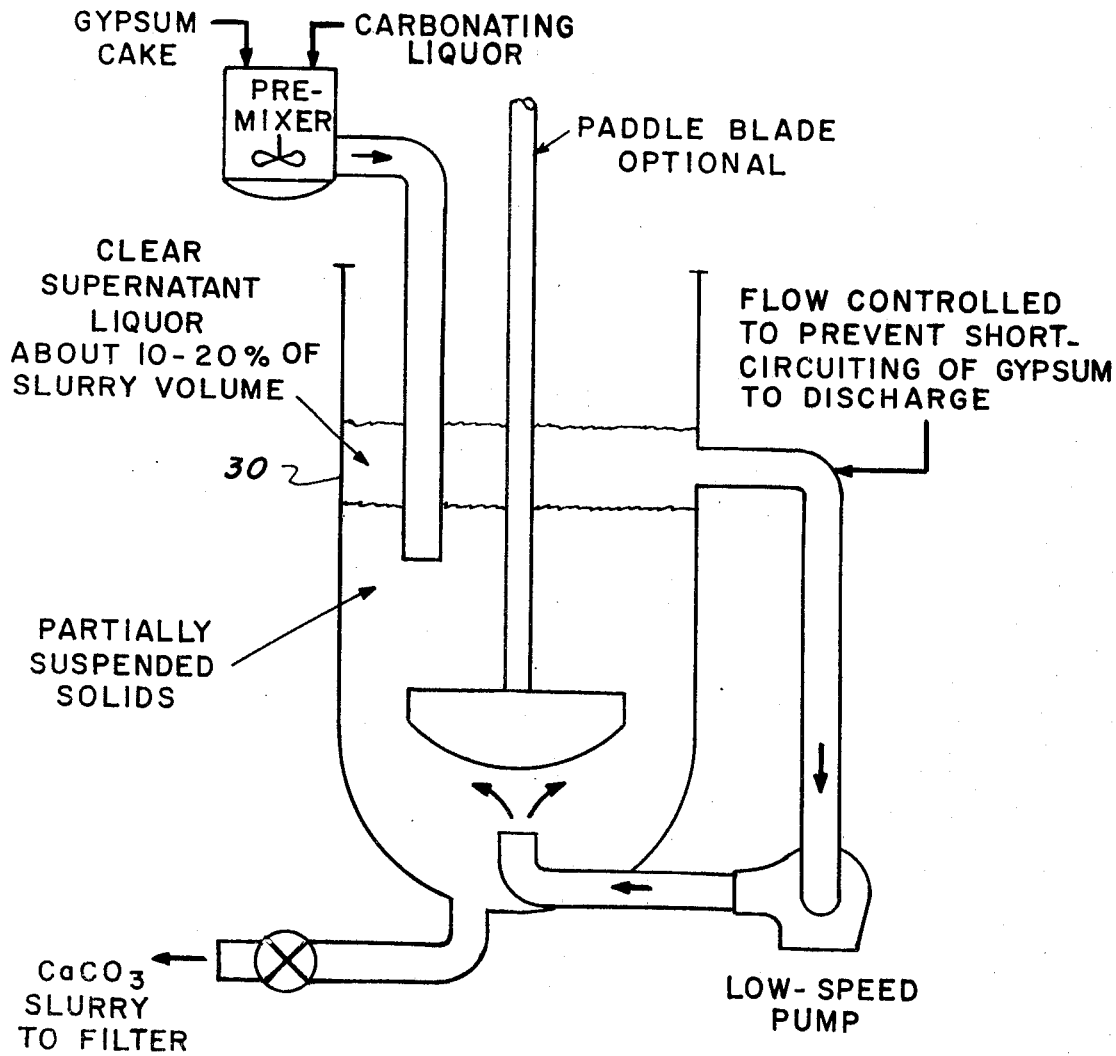

FIG. 3 is an enlarged view of my improved calcium sulfate conversion vessel showing the use of the paddle blade as being optional in that the supernatant recycle pumping system may and can be operated to achieve the effect of a fluidized bed in the section shown as partially suspended solids and by careful adjustment of the flow through the leg using the low-speed pump I can ensure that a layer of supernatant liquor free of the partially suspended calcium carbonate and unreacted calcium sulfate is maintained as shown.

Figure 2:
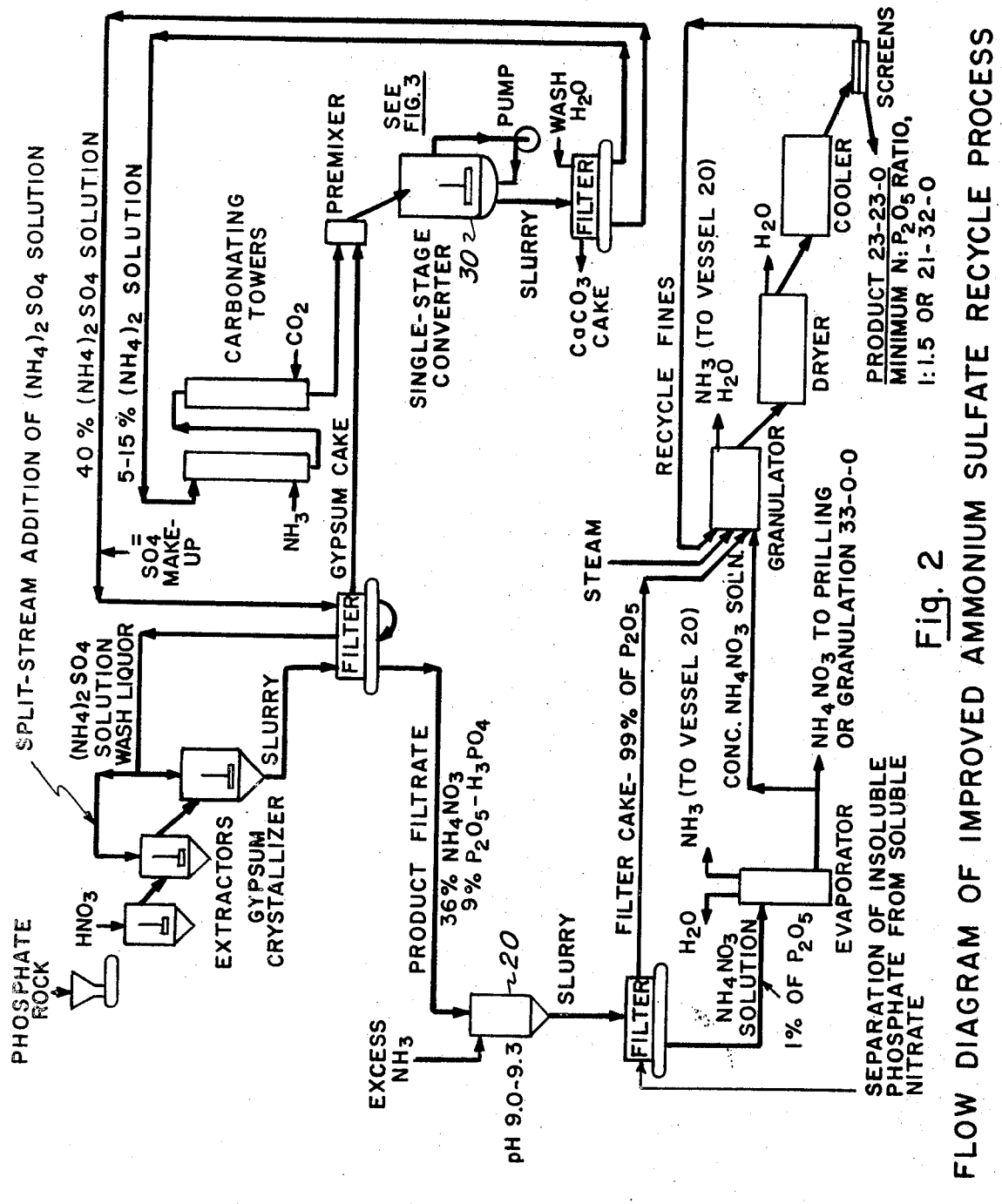
FIG. 2 is a flow diagram of my new improved ammonium sulfate recycle process having the advantages and desirable characteristics enumerated supra.
Figure 4:
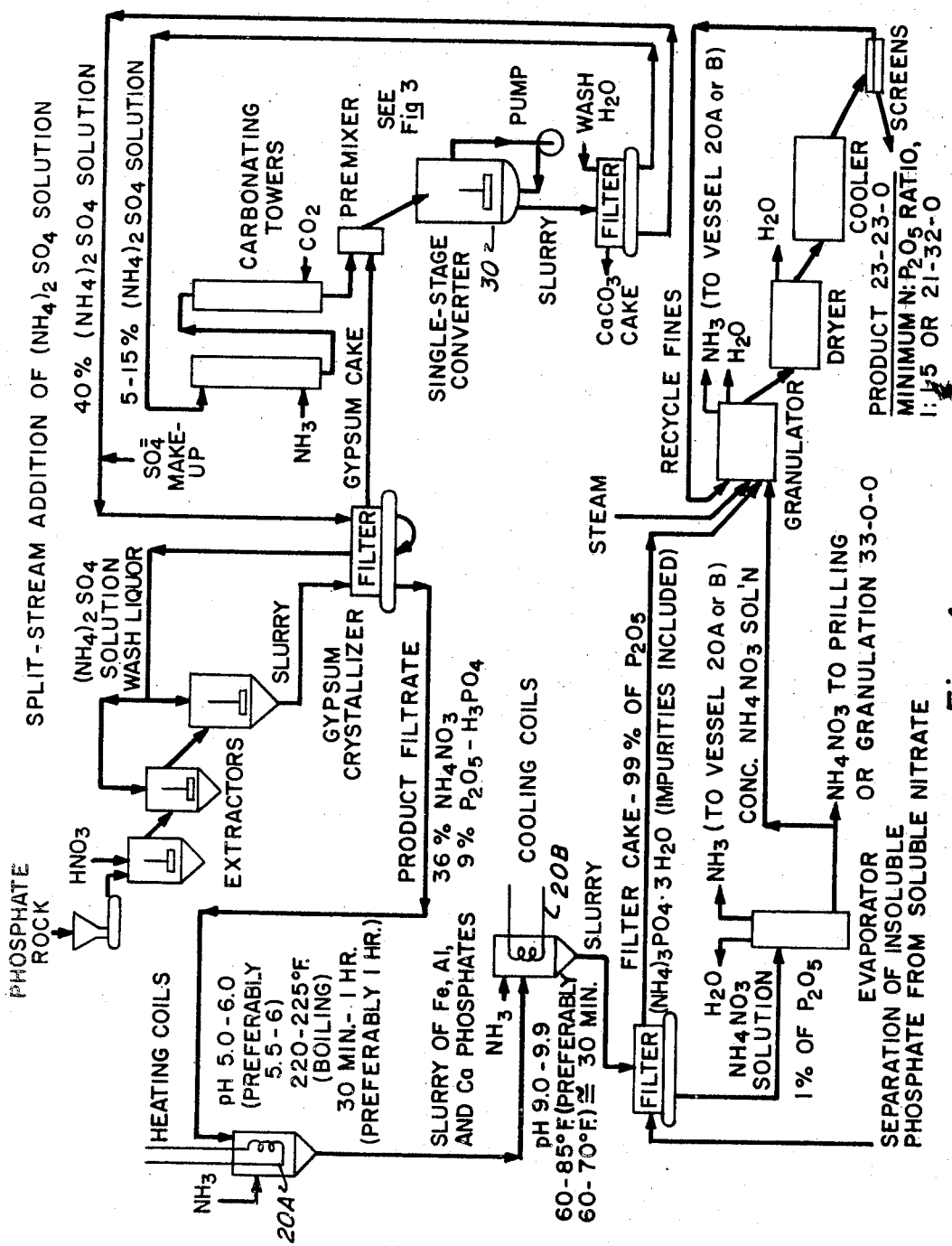

FIG. 4 is a flow diagram of my most recent improved ammonium sulfate recycle process having the advantages and characteristics enumerated supra wherein the ammoniation of the product filtrate is conducted in two stages rather than in a single stage shown in FIG. 2 supra. I have found in this displayed embodiment that by first ammoniating the product filtrate in the filter to a pH in the range of about 5 to 6 with the addition of external heat to ensure a temperature sufficient for boiling (220–235° F.) and for a retention time of about 30 minutes to one hour, I am able to shower down precipitates of iron and aluminum as well as calcium phosphate, said calcium phosphates being in minor amounts and representing the residual calcium not removed in the previous gypsum crystallization step. The resulting slurry from this first-stage ammoniation comprising aggregates of iron, aluminum, and residual calcium phosphate in a form easily filterable (500 gallons per hour per square foot) may be removed before the slurry is fed to the second stage ammoniation vessel. However, to simplify my process and to keep the filtering operation to a minimum, I normally do not remove impurities at this stage but pass them on to the second ammoniation stage wherein the pH is raised by addition of ammonia to the range of 9 to 9.9, preferably 9.3 to 9.9, over a period of about 0.5 to 1.5 hours, preferably 1 to 1.5 hours, under conditions ensuring cooling of the slurry to about 60–85° F. In the latest embodiment of my invention wherein I have split the ammoniation of the product filtrate into the aforementioned two separate stages, the objectives of my invention are easily and readily obtained not only on small scale but on bench-scale work wherein I use filter cake thicknesses upwards of 1½ to 2 inches thick, whereas in my earlier work which is reflected in the flow diagram in FIG. 2 I found that in scaling up from the small scale to the bench scale work, the desirable filtering rates were not obtainable because of clogging of filter cake and cloth greater than about ¼ inch in thickness with the iron, aluminum, and calcium phosphate impurities contained in the slurry so filtered. Therefore, the embodiment shown in my FIG. 2, although operable if the filter cake can be kept quite thin, has not been found to be fully desirable, or for that matter, practical when using filter cakes of the thickness which would be encountered in a commercial production facility. Thus, the scheme shown in this FIG. 4 is for all practical purposes the only one I have found to date which will operate under the conditions expected in a commercial size operation.

Figure 1:
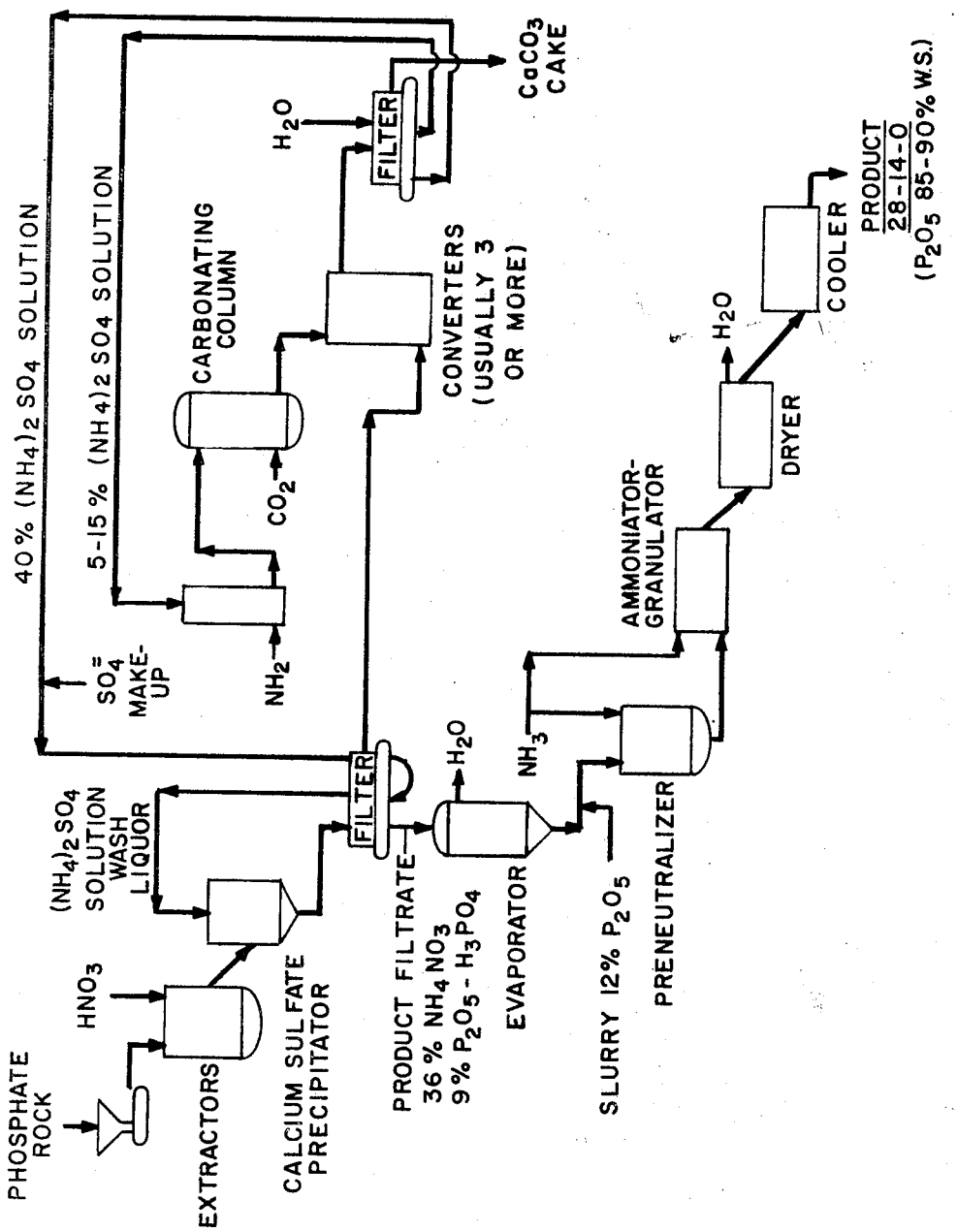
FIG. 1 is a flow diagram of the basic ammonium sulfate recycle process which was patented by Liljenroth in two forms in U.S. Pats. 1,758,448 and 1,902,652.

Referring now more particularly to FIG. 1, phosphate rock in the basic process is acidulated with about 50 to 65 percent nitric acid, and preferably about 60 to about 65 percent, in the extractor. The raw acidulate flows to the single-stage crystallizer where 40 percent ammonium sulfate solution recycle from the conversion unit is added in approximately stoichiometric proportions. The resulting CaSO$_4$:2H$_2$O slurry is filtered to separate the gypsum from the filtrate, which consists of about 9 percent P$_2$O$_5$ as phosphoric acid and about 36 percent ammonium nitrate plus residual Ca(NO$_3$)$_2$. The filtrate is concentrated by evaporation to a point where conventional preneutralization and TVA-type ammoniation and granulation result in a dried granular 28–14–0 product.

The gypsum cake on the filter is washed with the incoming (NH$_4$)$_2$SO$_4$ solution crystallizer feed, dumped, broken down to small lumps, in a disintegrator, and then continuously fed to the multistage converter. Ammonium carbonate absorption solution—made up in the packed absorption tower by adding NH$_3$ and CO$_2$ to CaCO$_3$ cake wash liquor—is fed simultaneously at about 10 percent excess over that stoichiometrically equivalent to the gypsum. The resulting CaCO$_3$ slurry is filtered, the cake is washed with water and dumped, and the strong ammonium sulfate is recycled to the gypsum wash and crystallization steps.

The 40 percent concentration of the recycle ammonium sulfate solution is determined by the fact that it is near saturation at the temperatures involved and higher concentrations would be impractical. Experience has shown that the amount of water going into the ammonium sulfate solution is adequate for CaCO$_3$ cake washing.

Referring now more particularly to FIG. 2 and 3, the product filtrate from the gypsum filter in the ammonium sulfate recycle process is a relatively dilute aqueous solution of phosphoric acid, ammonium nitrate, and residual calcium sulfate and nitrate; the average P$_2$O$_5$ and ammonium nitrate concentrations are 9 percent and 36 percent, respectively, as in the basic process.

Product separation

Referring now more specifically to FIG. 4, in my latest and most recently improved process, this filtrate is reacted with sufficient gaseous anhydrous ammonia in the first-stage vessel 20A to bring the pH to about 5.0–6.0 and preferably between about 5.5 and about 6.0 while additional heat is applied through internal steam coils to keep the liquid at or near boiling (220–235° F.). Under these conditions, the impurities calcium, iron, aluminum, and some fluorine precipitate as phosphate compounds and grow into large agglomerates of individual crystals; these agglomerates may then be removed from the system by filtration or centrifugation if it is desired to produce pure diammonium phosphate in the later stages; or the impurities, suspended in the ammoniated filtrate, preferably are passed on to the second ammoniating stage, vessel 20B, for further treatment. In the second stage, the filtrate is reacted with an excess of gaseous anhydrous ammonia in vessel 20B until the resulting slurry has a pH of about 9.1–9.3; the slurry temperature increases because of the heat of reaction but little evaporation occurs because of the low concentration of the phosphoric acid. The solid phase, which at this pH level is triammonium orthophosphate trihydrate [(NH$_4$)$_3$PO$_4$·3H$_2$O], plus insoluble iron-aluminum compounds and which precipitates under these conditions, is filtered out. This solid contains about 99 percent of the $P_2O_5$ present in the original filtrate. The mother liquor occluded in the cake is relatively pure ammonium nitrate solution (contains small amounts of ammonium sulfate and ammonium phosphate) and separation from the soluble cake would be difficult. Centrifuging might be preferable to filtration to minimize the amount of occluded mother liquor. However, complete separation would not be necessary. The wet cake could be granulated "as is" to yield an acceptable product.

Ammoniation to a lower pH, say 6.5 to 8, will result in incomplete precipitation of the phosphate so that two $N:P_2O_5$ products may be obtained, if desired.

The filtrate from the above operation is concentrated by evaporation and either granulated, prilled, or crystallized to yield solid ammonium nitrate or an N–P product, depending upon the degree of ammoniation of the original filtrate. All equipment is hooded and vented to srubbers to recover the excess ammonia with the incoming original product filtrate.

EXAMPLE I—IMPROVEMENT A

Small-sale batch operation by the above process in a practical and economical manner.

Calcium sulfate conversion

I believe that in addition to using calcium sulfate from (a) the ammonium sulfate recycle process (Liljenroth process), the Merseberg calcium sulfate conversion to $CaCO_3$ plus ammonium sulfate solution may be practiced using calcium sulfate from (b) the conventional wet-process phosphoric acid process, or (c) natural deposits. Commercial operations using sources "b" and "c" are in existence; no commercial operation involving source "a" is known, but several firms offer the process for licensing.

In my improved process, the $CaCO_3$ filtration problem (low filtration and wash rates) can be alleviated by establishing conditions which permit the growth of large agglomerates of individual spherulites, said spherulites comprising single crystals of calcium carbonate. Of primary importance is the use of minimum adequate mechanical agitation. I have found that vigorous agitation breaks up the agglomerates as they are formed. Also, vigorous agitation causes excessive crystal nuclei to form

TABLE I

| Test No. | Slurry pH | Filtration temp., °F. | Product analysis, wt. percent | | | | | Percent of $P_2O_5$ separated from liquor |
|---|---|---|---|---|---|---|---|---|
| | | | Total N | Total $P_2O_5$ | W.S. $P_2O_5$ | Alkaline ammonium C.I. $P_2O_5$ | $H_2O$ | |
| 1A (precipitated solid) | [1] 7.6 | 140 | 22.1 | 20.0 | 13.4 | 0 | 1.5 | 46 |
| 1B (evaporated solid) | | | 27.6 | 13.4 | 13.4 | 0 | 1.0 | |
| 2A (precipitated solid) | 9.3 | 140 | 21.7 | 32.1 | 28.5 | 0 | 2.1 | 99+ |
| 2B (evaporated solid) | | | 33.7 | 0.13 | | | 0.1 | |
| 3A (precipitated solid) | 9.0 | 75 | 21.6 | 34.7 | 30.8 | 0 | 1.1 | 92 |
| 3B (evaporated solid) | | | 33.9 | 0.25 | | | 0.1 | |
| 4A (precipitated solid) | 9.0 | 140 | 21.7 | 33.0 | 29.0 | 0 | 0.8 | 91 |
| 4B (evaporated solid) | | | 31.3 | 1.43 | 1.41 | 0 | 6.3 | |

[1] This is an alternate embodiment of improvement A wherein the $N:P_2O_5$ ratio may be adjusted to about 1:1 and not all $P_2O_5$ is separated from the ammonium nitrate solution filtrate in the second filtering step.

EXAMPLE II—IMPROVEMENT A

Bench-scale continuous operation

To improve the filtration rates of the separation step as exemplified in Example I, Improvement A above, the product filtrate from the gypsum filtration step (FIG. 2) containing, for example, 5.3 percent $P_2O_5$, 8.3 percent total N, 0.5 percent CaO, 0.5 percent F, and 0.29 percent $R_2O_3$, was ammoniated in the first stage with gaseous anhydrous $NH_3$ to pH 5.5–6.0 while being heated to boiling (about 220° F.) with steam coils. The precipitates of the impurities, calcium, iron, aluminum, and complexed fluorine, grew into agglomerates (of individual crystals) 6 to 80 microns in diameter (average 25 microns). The resulting slurry was readily filtrate prior to formation of triammonium phosphate trihydrate (TAP crystals) and could be removed to eliminate impurities from the ammonium phosphate product. However, as is shown in FIG. 4, I prefer to further ammoniate this slurry containing these impurities in a second ammoniator vessel to form TAP crystals with subsequent removal of these crystals and impurities in a single filtering operation rather than in two separate filter operations.

The slurry containing impurities precipitated in the first-stage ammoniation vessel was run to the second stage where it was ammoniated to pH 9.3; cooling coils maintained this stage at 60–85° F. TAP crystals (100 x 300 microns) precipitated and were easily filtered at 220 gallons per hour per square foot or 900 pounds dry solids per hour per square foot. Cake thickness was in the range of 1½ to 2 inches, as would be encountered in a commercial size operation. A representative ammonium nitrate filtrate from the above filtering step contained 0.003 percent CaO, 0.002 percent $Fe_2O_3$, 0.006 percent $Al_2O_3$, and 0.11 percent $P_2O_5$. This was equivalent to 99.5 percent removal of CaO, 99.1 percent removal of $Fe_2O_3$, 97.2 percent removal of $Al_2O_3$, and 98.6 percent removal of $P_2O_5$. This example demonstrates that a high degree of removal of impurities and phosphate can be achieved which results in a large number of small crystals of calcium carbonate that do not grow appreciably or agglomerate within a reasonable time, i.e., two to four hours as opposed to about 30 days.

The vessel 30 which I designed to give adequate contact between incoming gypsum and the carbonating liquor without severe agitation is shown in FIG. 3. The $CaCO_3$ precipitate is maintained in only a partially suspended state by the slowly turning (tip speed about 25 ft./min.) turbine agitator and by the rising stream of mixed supernatant ammonium sulfate solution and ammonium carbonate liquor.

Alternatively, the urbine agitator may be dispensed with and the gentle agitation may be obtained exclusively by such rising stream of carbonate sulfate solution. The stream of liquor tends to carry the smaller particles to the top of the crystal bed, leaving the larger agglomerates to be drawn off at the bottom of the vessel. In carrying out my invention in this alternate embodiment, some provision should be made to balance discharge of liquid and solid product to prevent depletion of this solid phase in the vessel.

Split-stream addition of $(NH_4)_2SO_4$ solution

Referring now to improvement C, supra, which need not necessarily be used together with improvements A plus B, I have shown in FIG. 2 the use of two extractors prior to the gypsum crystallizer. I have determined that in this specific embodiment of my invention, the addition of a portion of the total stoichiometric amount of ammonium sulfate solution used for crystallization of gypsum should be added to the extractor during the treatment of phosphate rock with nitric acid and that the remainder of the ammonium sulfate solution should be added to the acidulant slurry in a normal manner. This diversion of a portion of the ammonium sulfate solution has been found to be necessary to ensure that the final gypsum slurry will have an improved filtration rate as compared to prior-art embodiments in which this improvement is not incorporated.

The addition of up to 10 percent of the total ammonium sulfate solution in the extractor will serve to help condition the impurities or undissolved, acid insoluble, material originally present in the rock; in addition, the presence of ammonium sulfate solution in the extractor will cause precipitation of $CaSO_4$ which will ultimately serve as "seed" crystals in the subsequent crystallization step. These "seed" crystals aid in increasing the final particle size of the gypsum and thus gives a higher filtration rate due to said increased particle size.

In order that those skilled in the art may better understand how the present invention can be practiced, the following examples of the use of my improvements A, B, and C are over both the basic ammonium sulfate recycle processes of Liljenroth and the modifications and alleged improvements thereover referred to in my discussion of the prior art for yielding the desired objectives and products of the character indicated herein, are given by way of illustration and not by way of limitation.

EXAMPLE I.—IMPROVEMENT B

Wet gypsum cake [67 percent $CaSO_4 \cdot 2H_2O$, 13 percent $(NH_4)_2SO_4$, 0.7 percent $P_2O_5$, and about 15 percent $H_2O$] from the ammonium sulfate recycle gypsum crystallization step (bench scale) was fed to the 3-liter converter at the rate of 700 grams per hour. The solid was slurried with 664 grams per hour of ammonium carbonate liquor (15.4 percent $NH_3$) and fed to the top of the reactor. This was equivalent to a 10 percent excess of $NH_3$ and $CO_2$ over stoichiometric requirements of the $CaSO_4$ input. The agitator (paddle blade) was rotated at a low speed (tip speed, 25 ft. per minute, which appears to be about the preferred speed although I can operate at tip speed in the range from about 15–40 ft./min.). The flow rate of the supernatant liquor recirculated from the top of the vessel to the bottom was about 6.6 liters per hour. The resulting calcium carbonate calcium sulfate slurry temperature was maintained at 125° F. The average retention time based on $CaSO_4$—ammonium carbonate liquor volume feed rates was 3 hours. Filtration samples (about 1000 cc.) were drawn off from the bottom outlet of the vessel every 60 minutes after the first 180 minutes.

The average filtration rate of the $CaCO_3$ slurry (expressed as ammonium sulfate solution, 37.4 percent by weight) was 295 gallons per hour per square foot; wash rates (fresh water in two stages) were from 220 to 255 gallons per hour per square foot. The overall filtering rate including two water washes was 245 gallons per hour per square foot. This is equivalent to a solids rate (dry basis) of about 600 pounds per hour per square foot of impure calcium carbonate. Filtration rates in the conventional multistage suspended slurry operation in previous tests were only 20 to 40 gallons per hour per square foot.

Photomicrographic examination showed the range of $CaCO_3$ agglomerate particle sizes to be 10–400 microns, the average size being about 40 microns. The solid had a "grainy" appearance and contained very few individual crystals. The $CaCO_3$ was believed to be of the calcite form. The maximum size noted in the tests using conventional and known modifications of the basic ammonium sulfate recycle process was only about 70 microns, with the average being only about 15 microns.

EXAMPLE II.—IMPROVEMENT B

Wet gypsum cake [70.9 percent $CaSO_4 \cdot 2H_2O$; 9.7 percent $(NH_4)_2SO_4$; 0.1 percent $P_2O_5$; and 16.5 percent $H_2O$] produced from the ammonium sulfate recycle gypsum crystallization step in the pilot plant was fed to the premixer at a rate of 652 grams per hour, continuously. Ammonium carbonate solution (15.0 percent $NH_3$) was also fed at the rate of 652 grams per hour to the premixer. This was equivalent to a 6 percent excess of $NH_3$. The premixer was a small, non-heated, agitated vessel with a retention time of about 2 minutes. The gypsum slurry overflowed to the single-stage converter to a point beneath the surface of the clear, supernatant liquor. The slurry was mixed by the countercurrent upward movement of liquid, thus giving solid liquid contact with a minimum of shearing agitation. As the reaction proceeded, the solid worked downward to the bottom of the reactor for discharge. Near the bottom a relatively slow-speed agitator (tip speed 25 ft./min.) increased the degree of agitation. This allowed a constant composition of solid and liquid to be removed, without preferentially removing solid. An automatic pump, acting as a valve, allowed slurry to discharge at intervals of about 5 minutes. The pump was controlled by a liquid level electronic controller. Throughout the test, clear liquid was circulated from the top of the reactor to the bottom by a pump. The liquid rate was 20.4 liters per hour. This rate kept the solid bed semi-fluidized to a point where the solid occupied from about 80 percent to about 90 percent of the volume. This was the maximum tolerable circulation rate to maintain sufficient clear liquid for recirculation. A settled solid of this slurry will occupy only 48 percent of the volume as measured in a graduated cylinder.

The slurry was filtered onto a retaining Teflon cloth at 15 inches Hg vacuum. The minimum $CaCo_3$ cake thickness was 1½ inches. The cake was washed with 2 equal portions of fresh water. The product filtrate (ammonium sulfate solution) rate was 221 gallons per hour per square foot with a composition of 38.8 percent $(NH_4)_2SO_4$. The wash rates were 235 to 331 gallons per hour per square foot. The overall rate including two washes was 239 gallons per hour per square foot. This is equivalent to 540 pounds (dry basis) per hour per square foot of $CaCO_3$. The conversion was 95 percent at 125° F. in 3.25 hours with a 6 percent excess of $NH_3$ over that stoichiometrically equivalent to the CaO in the gypsum.

The $CaCO_3$ particle size ranged from 1–300 microns with an average size of 100 microns. The proportion of small particles was quite low, with less than about 0.01 percent by weight of the particles being less than 10 microns.

TABLE II.—RESULTS OF CONVERSION TESTS

| Conditions | | | Conversion of gypsum, Percent | Filtration rates, gal./(hr.) (sq.ft.) | | | | Dry rate lb./hr. ft. |
| --- | --- | --- | --- | --- | --- | --- | --- | --- |
| Retention time, hrs. | Temp., °F. | Excess NH₃, Percent | | Product solution | First wash | Second wash | Overall | |
| 3.25 | 125 | 6 | 95 | 221 | 235 | 331 | 239 | 540 |
| 3.0 | 125 | 10 | 96 | 295 | 220 | 255 | 245 | 600 |

EXAMPLE III.—IMPROVEMENT C

Florida flotation concentrate, 32.7 percent $P_2O_5$, of a size to pass through a 20-mesh screen was reacted with 65 percent $HNO_3$ for 30 minutes. A portion of the total ammonium sulfate solution was added to the nitric acid prior to addition of phosphate rock. After acidulation, the rock extract slurry was further reacted with ammonium sulfate solution to yield a final gypsum slurry. This slurry was filtered to yield a gypsum cake and a product filtrate. Specifically, 300 g. of rock was reacted with 489.9 g. of 65 percent $HNO_3$ and 83.4 g. of 40 percent $(NH_4)_2SO_4$ solution for a total time of 30 minutes. After this time, an additional 750.6 grams of 40 percent $(NH_4)_2SO_4$ solution was added with stirring for an additional 30 minutes. The resulting slurry was filtered onto a polyethylene filter cloth (thread count, 120 x 40) at 15 inches Hg vacuum. The cake was washed with two equal portions of fresh water. The filtration rate of product filtrate was 30 gallons per hour per square foot, with wash rates of 21 and 30 gallons per hour per square foot, respectively. The cake thickness was 2⅛ inch.

In another test, 300 grams of the same rock was treated with 489.9 grams of 65 percent $HNO_3$ for 30 minutes. After this time, 834.0 grams of 40 percent $(NH_4)_2SO_4$ solution was added with stirring for an additional 30 minutes. The resulting slurry was filtered onto the same cloth as described above. The cake was washed with two equal portions of fresh water as before. The filtration rate of product filtrate was 17 gallons per hour per square foot while that of the two washes was 12 and 18 gallons per hour per square foot, respectively. The cake thickness was 2⅛ inch as before.

Examination of the cake under a microscope showed that the product having the higher filtration rate (i.e., when split-stream ammonium sulfate solution was used) was larger in particle size because the quantity of fine material of 1–10 micron size was less. In the slower filtering sample, the 1–10 micron material consisted of very thin plate crystals, which interfered with filtration. Agglomerates or aggregates in both products were around 30 microns in size. The operating conditions and the results therefrom in these and similar tests are shown in Table III below.

TABLE III.—RESULTS OF SPLIT STREAM ADDITION OF $(NH_4)_2SO_4$ SOLUTION

| Method of $(NH_4)_2SO_4$ addition | Test No. | Filtration rates, gal./(hr.)(sq. ft.) | | |
|---|---|---|---|---|
| | | Product | First wash | Second wash |
| 10% $(NH_4)_2SO_4$ solution added to extractor, 90% added to precipitator. | A | 30 | 21 | 30 |
| | B | 32 | 25 | 39 |
| No $(NH_4)_2SO_4$ solution added to extractor, 100% added to precipitator. | C | 17 | 12 | 18 |
| | D | 15 | 11 | 15 |

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the United States is:

1. In an improved ammonium sulfate recycle nitric phosphate process for the production of ammonium phosphate nitrate in a form eminently suitable for argonomic utility comprising the steps of acidulating in extractor vessels upstream from a later-mentioned precipitator vessel particulate phosphate rock with approximately stoichiometric amounts of nitric acid of a concentration in the range of about 50 percent to about 65 percent $HNO_3$ to form an acidulate of calcium nitrate and phosphoric acid, together with dissolved impurities, said dissolved impurities derived from said partciulate phosphate rock and consisting principally of iron and aluminum; subsequently reacting in a precipitator vessel an ammonium sulfate solution containing in the range from about 20 percent to about 40 percent $(NH_4)_2SO_4$ with the acidulate resulting from the reaction of said nitric acid with said particulate phosphate rock to thereby form a resulting slurry containing principally calcium sulfate, ammonium nitrate, and phosphoric acid, together with minor amounts of solubilized congeneric impurities from said particulate phosphate rock; subjecting said resulting slurry to a first filtering step; recovering from said first filtering step as the solid residue portion thereof gypsum cake; recovering from said first filtering step as intermediate product a filtrate of principally ammonium nitrate and phosphoric acid; the improvement in combination therewith for producing two separate and alternate products (a) ammonium nitrate and (b) ammonium phosphate nitrate, and for ensuring a degree of flexibility of the $N:P_2O_5$ ratio in said product (b) with a minimum $N:P_2O_5$ ratio thereof of 1:1.5, said improvement comprising the following additional steps:

(1) introducing said intermediate product filtrate, together with anhydrous ammonia, into a first reactor vessel;

(2) controlling the quantity of ammonia introduced into said first reactor vessel relative to the quantity of intermediate product filtrate introduced to maintain the resulting slurry formed therein in the range of about 5 to about 6;

(3) simultaneously adding extra heat to said first reactor vessel to maintain the temperature therein in the range of about 220–235° F. to thereby ensure boiling of the material therein;

(4) adjusting the quantities of intermediate product filtrate and anhydrous ammonia introduced to said first reactor vessel and the resulting slurry withdrawn therefrom to maintain the residence time therein for a period of about 30 minutes to about one hour;

(5) withdrawing a portion of the resulting slurry in said first reactor vessel to a second reactor vessel, together with a quantity of anhydrous ammonia to maintain the pH of the slurry in said second reactor vessel in the range from about 9 to about 9.9;

(6) cooling the materials in said second reactor vessel to maintain the temperature therein in the range of about 60° to about 85° F.;

(7) controlling the addition to and removal of materials from said second reactor vessel to maintain the residence time of the material therein in the range of 0.5 to 1.5 hours;

(8) removing a portion of the resulting slurry in said second reactor vessel to a second filtering step;

(9) removing in said second filtering step the insoluble precipitate consisting essentially of (a) triammonium orthophosphate trihydrate, (b) calcium phosphates, and (c) minor amounts of iron and aluminum phosphates, as filter cake containing in the range from about 91 percent to greater than about 99 percent of the $P_2O_5$ values originally present in said particulate phosphate rock, together with (d) occluded ammonium nitrate solution derived from the mother liquor formed in said reactor vessel;

(10) recovering from said second filtering step as filtrate an aqueous solution consisting essentially of ammonium nitrate, together with the remaining percentile of the $P_2O_5$ values originally present in said particulate phosphate rock;

(11) applying heat energy to said ammonium nitrate filtrate to concentrate same to a predetermined level and to release therefrom excess amounts of ammonia and water vapor; and

(12) applying heat energy to said filter cake from said second filtering step to release therefrom ammonia and water vapor resulting in a stabilized solid dry product consisting essentially of ammonium phosphate, ammonium nitrate, and minor amounts of calcium phosphate, said product characterized by the fact that the minimum $N:P_2O_5$ ratio is about 1:1.5.

2. The process of claim 1 wherein the pH of the slurry in said first reactor vessel is maintained in the range from about 5.5 to 6, wherein the pH of the slurry in said second reactor vessel is maintained at about 9.3 and the filter cake contains greater than about 99 percent of the $P_2O_5$ values originally present in the particulate phosphate rock.

3. The process of claim 1 wherein the temperature in said second reactor vessel is maintained in the range of about 60° to about 70° F.

4. The process of claim 1 wherein the ammonium sulfate solution is divided into two streams, one stream of which is added to said precipitator vessel and the other stream of which is added to the extractor vessel immediately upstream from said precipitator vessel.

5. The process of claim 2 wherein the proportion of ammonium sulfate solution added to said extractor vessel immediately upstream from said precipitator vessel ranges upwards to about 10 percent by weight of the total ammonium sulfate solution used.

6. In an improved ammonium sulfate recycle nitric phosphate process for the production of ammonium phosphate nitrate in a form eminently suitable for agronomic utility comprising the steps of acidulating in extraction vessels upstream from a later-mentioned precipitator vessel particulate phosphate rock with approximately stoichiometric amounts of nitric acid of a concentration in the range of about 55 percent to about 65 percent $HNO_3$ to form an acidulate of calcium nitrate and phosphoric acid, together with dissolved impurities, said dissolved impurities derived from said particulate phosphate rock and consisting principally of iron and aluminum; subsequently reacting in a precipitator vessel an ammonium sulfate solution containing in the range from about 20 percent to about 40 percent $(NH_4)_2SO_4$ with the acidulate resulting from the reaction of said nitric acid with said particulate phosphate rock to thereby form a resulting slurry containing principally calcium sulfate, ammonium nitrate, and phosphoric acid, together with minor amounts of solubilized congeneric impurities from said particulate phosphate rock; subjecting said resulting slurry to a first filtering step, recovering from said first filtering step as the solid residue portion thereof gypsum cake; recovering from said first filtering step as intermediate product a filtrate of principally ammonium nitrate and phosphoric acid; subjecting said gypsum cake from said first filtering step to conversion to calcium carbonate and aqueous ammonium sulfate by reacting therewith ammonium carbonate solution; the improvement in combination therewith for ensuring that the calcium carbonate cake resulting from the gypsum cake conversion is in a form conducive to rapid and easy filtering to thereby enhance the throughput of the gypsum cake conversion step, which improvement comprises the additional steps of:

(1) premixing said gypsum cake with carbonating liquor in a premixing vessel and resulting in a gypsum slurry;

(2) introducing said gypsum slurry into a single gypsum cake slurry vessel to a point beneath a layer of supernatant liquor contained therein and maintained over a later-mentioned fluidized bed, said supernatant liquor comprising a solution of ammonium carbonate and ammonium sulfate;

(3) recycling the supernatant liquor maintained over a fluidized bed of partially suspended solids, said solids consisting principally of calcium carbonate and unreacted calcium sulfate dihydrate into the lower portion of said single gypsum cake conversion vessel; adjusting the control of flow of said supernatant liquor into the bottom of said single gypsum cake conversion vessel to maintain therein a region of said partially suspended fluidized solids and a layer thereover of said supernatant liquor; and withdrawing from the bottom portion of said single gypsum cake conversion vessel the resulting calcium carbonate slurry to a calcium carbonate filtering step;

said process characterized by the fact that said calcium carbonate slurry comprises calcium carbonate particles in alkaline ammonium sulfate solution together with minor amounts of unreacted calcium sulfate dihydrate, said calcium carbonate particles consisting essentially of aggregates of spherulites, said spherulites comprises calcium carbonate single crystals arranged in a form generally spherical.

7. The process of claim 6 wherein the residence time of the gypsum slurry in the single gypsum conversion vessel is in the range from about 2 to about 4 hours.

8. The process of claim 7 wherein the temperature in said single gypsum cake conversion vessel is in the range from about 75° F. to about 140° F.

9. The process of claim 8 wherein the percent of excess ammonium carbonate in said gypsum cake conversion vessel over that stoichiometrically required for gypsum conversion in the single gypsum cake vessel is in the range from about 5 percent to about 25 percent.

10. The process of claim 6 wherein the liquid recirculation rate through the fluidized bed in said gypsum conversion vessel is adjusted to provide a fluidized volume of solids comprising about 80 percent to about 90 percent of the total slurry volume in said gypsum conversion vessel, said process further characterized by the fact that the average size of said calcium carbonate particles is about 100 microns and the filtering rate of the resulting calcium carbonate slurry is greater than about 200 gallons per hour per square foot.

11. The process of claim 6 wherein the agitation in said single gypsum cake slurry vessel is maintained at an equivalent of about 15 to about 40 feet per minute—tip speed.

12. The process of claim 4 in combination with the process of claim 6.

References Cited

UNITED STATES PATENTS

| 1,902,652 | 3/1933 | Liljenroth | 71—35 |
| 2,689,175 | 9/1954 | Strelzoff et al. | 71—39 |
| 3,037,855 | 6/1962 | Smith | 71—43 |

REUBEN FRIEDMAN, Primary Examiner

C. N. HART, Assistant Examiner

U.S. Cl. X.R.

23—106; 71—39, 43

UNITED STATES PATENT OFFICE
CERTIFICATE OF CORRECTION

Patent No. 3,515,534  Dated June 2, 1970

Inventor(s) Owen W. Livingston

It is certified that error appears in the above-identified patent and that said Letters Patent are hereby corrected as shown below:

Column 1, line 21, "anl" should be -- and --
         line 48, "variel" should be -- varied --
Column 2, line 17, after "calcium" insert -- carbonate --
Column 3, line 31, change "wish" to -- wash --
         line 74, after "result" insert -- in --
Column 4, line 21, change "gently" to -- gentle --
Column 7, line 52, change "filtrate" to -- filterable --
Column 8, line 50, change "urbine" to -- turbine --
Column 10, table II, second column under heading "Filtration rates"
         insert -- second -- and in the third column under the
         same heading delete "second."
         In the last column the heading should be "Dry rate lb./hr./ft.$^2$ "

SIGNED AND
SEALED
SEP 22 1970

(SEAL)
Attest:

Edward M. Fletcher, Jr.
Attesting Officer

WILLIAM E. SCHUYLER, JR.
Commissioner of Patents